United States Patent
Freysz et al.

(10) Patent No.: US 10,260,955 B2
(45) Date of Patent: Apr. 16, 2019

(54) METHOD AND SYSTEM FOR VISUALISING INFRARED ELECTROMAGNETIC RADIATION EMITTED BY A SOURCE

(71) Applicants: UNIVERSITE DE BORDEAUX, Talence (FR); CENTRE NATIONAL DE LA RECHERCHE SCIENTIFIQUE, Paris (FR)

(72) Inventors: Eric Freysz, Pessac (FR); Benoit Philippeau, Gradignan (FR)

(73) Assignees: UNIVERSITE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 94 days.

(21) Appl. No.: 15/115,777

(22) PCT Filed: Feb. 2, 2015

(86) PCT No.: PCT/FR2015/050233
§ 371 (c)(1),
(2) Date: Aug. 1, 2016

(87) PCT Pub. No.: WO2015/114278
PCT Pub. Date: Aug. 6, 2015

(65) Prior Publication Data
US 2017/0010161 A1 Jan. 12, 2017

(30) Foreign Application Priority Data
Feb. 3, 2014 (FR) .................................. 14 00294

(51) Int. Cl.
*G01J 5/58* (2006.01)
*G01J 1/50* (2006.01)
*G01J 5/48* (2006.01)

(52) U.S. Cl.
CPC . *G01J 5/58* (2013.01); *G01J 1/50* (2013.01); *G01J 5/48* (2013.01)

(58) Field of Classification Search
CPC ................... G01J 1/50; G01J 5/48; G01J 5/58
See application file for complete search history.

(56) References Cited

U.S. PATENT DOCUMENTS

| 5,772,916 A | 6/1998 | Jamil et al. |
| 6,340,820 B1 | 1/2002 | Youden et al. |

(Continued)

FOREIGN PATENT DOCUMENTS

| GB | 2 235 060 A | 2/1991 | |
| WO | WO 2008087077 A1 * | 7/2008 | ............. B32B 17/10 |
| WO | 2014/016525 A1 | 1/2014 | |

OTHER PUBLICATIONS

International Search Report, dated Apr. 22, 2015, from corresponding PCT application.

*Primary Examiner* — Marcus H Taningco
(74) *Attorney, Agent, or Firm* — Young & Thompson

(57) ABSTRACT

A method and system for visualizing infrared radiation emitted by a source, the visualizing system including a substrate, at least one solid temperature-sensitive layer containing thermochromic pigments having at least one transition temperature TH associated with a visible color change, and at least one intermediate layer placed between the substrate and the solid layer containing thermochromic pigments; the substrate, the at least one intermediate layer and the solid temperature-sensitive layer containing thermochromic pigments forming a multilayer suitable for absorbing infrared electromagnetic radiation and for inducing a local temperature increase dT; and the at least one intermediate layer being suitable for transferring, by thermal conduction, the local temperature increase dT to a region of the solid temperature-sensitive layer, so as to induce a local (Continued)

Figure 1:
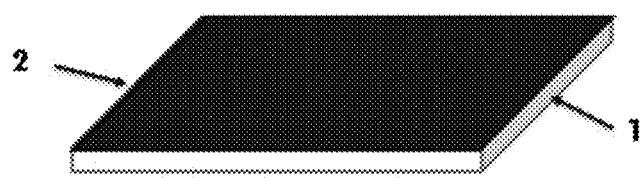

change in the visible color of the solid temperature-sensitive layer of thermochromic pigments.

12 Claims, 4 Drawing Sheets

(56) References Cited

U.S. PATENT DOCUMENTS

| | | | |
|---|---|---|---|
| 2004/0155154 A1* | 8/2004 | Topping | C03C 17/3411 |
| | | | 244/171.7 |
| 2011/0199685 A1* | 8/2011 | Ito | B32B 3/30 |
| | | | 359/589 |
| 2011/0267686 A1* | 11/2011 | Kageyama | B60J 1/2041 |
| | | | 359/359 |
| 2012/0092756 A1* | 4/2012 | Yoshida | B32B 27/06 |
| | | | 359/351 |

* cited by examiner

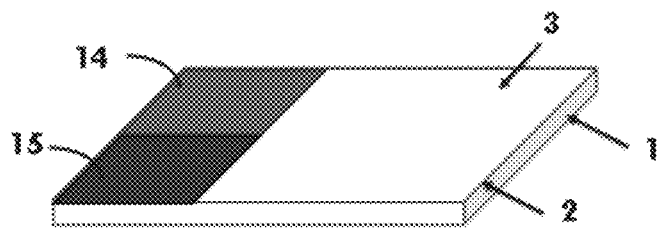
Fig. 11
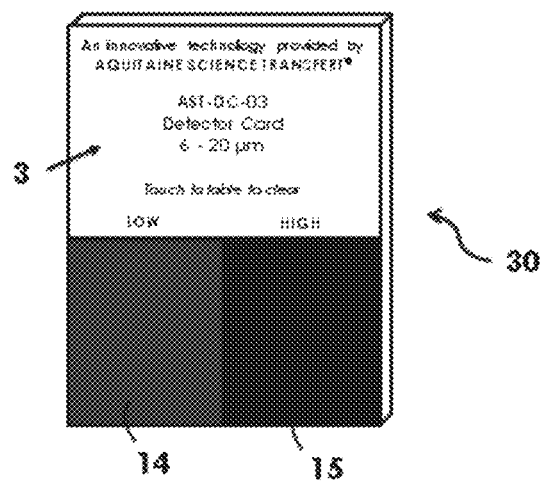
Fig. 12
Fig. 13
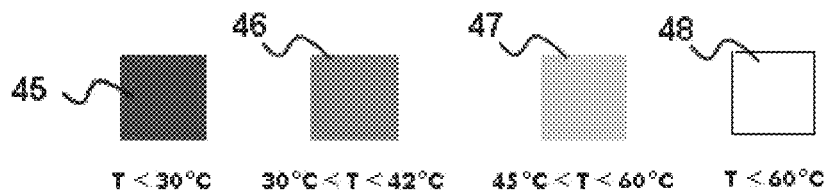
T < 30°C    30°C < T < 42°C    45°C < T < 60°C    T < 60°C
Fig. 14
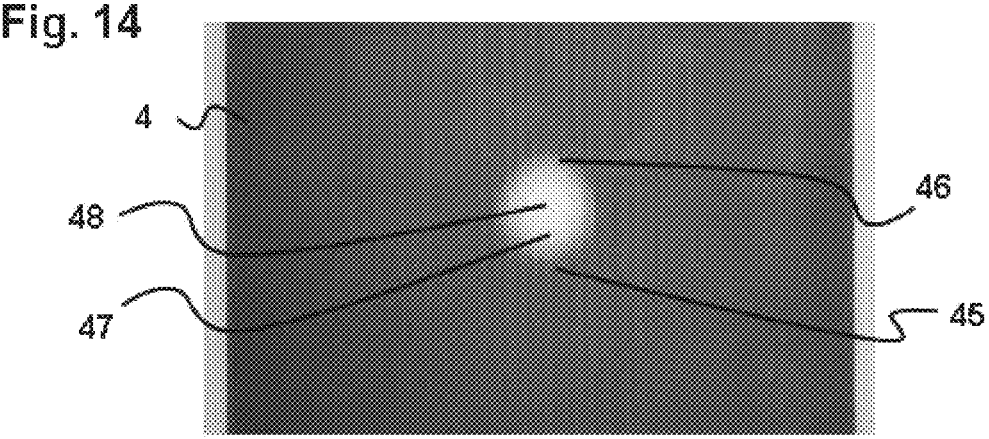

METHOD AND SYSTEM FOR VISUALISING INFRARED ELECTROMAGNETIC RADIATION EMITTED BY A SOURCE

TECHNICAL FIELD

The present invention is related to a method of and a system for viewing an infrared electromagnetic wave.

In the present document, an infrared electromagnetic wave is understood as being an electromagnetic wave having a wave length of more than 1 micron (μm) and less than 20 microns.

PRIOR ART

Generally, in an optical arrangement, when the electromagnetic wave is outside the visible region of the spectrum, especially when it is in the infrared region, one uses a card for viewing for detecting, positioning, or observing the spatial distribution of that electromagnetic wave.

There are different systems for viewing depending on the spectral domain of the respective electromagnetic wave. Especially, cards for viewing are known which are easy to use and which are not expensive.

The different systems for viewing are based on different types of interaction between a material and an infrared electromagnetic wave, those different interactions modifying the optical properties or the physicochemical properties of the respective material.

A first type of interactions is based on using non-linear optical materials which allow to convert a beam in the infrared region by non-linear interactions with two or three photons into a beam in the visible region. However, those non-linear optical systems are extremely complex and they are limited to high-intensity coherent laser beams and to a spectral domain of a single wave length for a specific material.

Another type of interactions is based on the use of phosphorescent or fluorescent materials which have the property of absorbing infrared waves and re-emitting waves in the visible region. Document U.S. Pat. No. 5,772,916 describes a screen comprising a phosphorescent powder deposited on a substrate and allowing for detecting or localizing a source of infrared waves. Likewise, document U.S. Pat. No. 6,340,820 describes a card for viewing comprising an active layer of phosphorescent components deposited on a substrate, which is intended for detecting and measuring the profile of a beam in the region of near infrared of 0.8 to 1.7 microns. The phosphorescent cards for viewing are sufficiently sensitive for allowing viewing of an infrared wave emitted from an electroluminescent diode. However, the sensitivity of phosphorescent cards for viewing in the near infrared depends on the ambient lighting. On the other hand, the use of phosphorescent cards for viewing is limited when approaching infrared waves having a wave length of more than two microns or having a high power density. A wave having a high power density can deactivate the sensitive zone of the card for viewing. In this case, an ultra-violet-light (UV) lamp is used for reactivating the sensitive surface with phosphorescent component and, thereby, viewing the traces of the infrared wave. This way of doing is of course much less practical than a direct viewing. In any case, phosphorescent cards for viewing are ineffective for viewing far-infrared waves of 2 to 20 microns.

Document GB-2,235,060, for example, describes a device for and a method of viewing waves in the visible and near-infrared region limited to a range of wave lengths from 600 to 1,500 nm, which have a spectral band width of several hundreds of nanometers.

There are other systems for viewing infrared beams which are based on the interaction with liquid crystals or on electronic systems. However, the latter systems are complex as far as their use is concerned and they are generally pretty expensive.

Patent document WO-2014/016525 describes a device for and a method of viewing electromagnetic terahertz waves that apply spin transition material.

There is a need for an inexpensive method of and a device for viewing infrared electromagnetic waves which are easy to be implemented, have a sensitivity threshold for exposure to infrared waves over la large spectral region, preferably from 1 through 20 microns, for a power density running from 1 mW/cm$^2$ through several hundreds of W/cm$^2$, while being not very sensitive to fluctuations of lighting or ambient temperature. There also is a need for a method of and a system for viewing the spectral distribution of the power density of an infrared beam, sensitive over a large spectral region.

The present invention aims at overcoming the drawbacks of prior systems for viewing infrared waves and proposes particularly a system for viewing infrared electromagnetic waves emitted from a source.

According to the invention, the system for viewing comprises a substrate, at least one solid thermal layer comprising thermochromic pigments dispersed in a solid matrix, the thermochromic pigments having at least one transition temperature ($T_H$, $T_B$) which preferably is higher than the operating temperature of the system, said at least one transition temperature ($T_H$, $T_B$) being associated with an apparent color change of said thermochromic pigments to the visible region, and at least one intermediate layer situated between the substrate and the solid thermal layer comprising the thermochromic pigments, said at least one intermediate layer (2, 3) being thermally conductive, said substrate, said at least one intermediate layer, and the solid thermal layer constitute all together a stack adapted to absorb an infrared electromagnetic wave and to induce a local temperature increase dT and said at least one intermediate layer is adapted for transferring by thermal conduction said local temperature increase dT to a region of the thermal solid layer in a way to induce an apparent local change of color of the thermal solid layer comprising thermochromic pigments.

Advantageously, the incident infrared wave has a power density I within a range of 1 mW·cm$^{-2}$ to several hundreds of W·cm$^{-2}$.

The system for viewing is easy to use, inexpensive as to the costs for production, and sensitive over a large scale of wave lengths in the infrared region. Advantageously, the system for viewing according to the invention is sensitive over a large scale of wave lengths which extend over a large spectral band width of several microns inside a wave length region from 1 micron to 20 microns. In an embodiment, the system for viewing is sensitive in a wave length region running at least from 1.5 microns to 5 microns. In another embodiment, the system for viewing is sensitive in a wave length region running at least from 6 microns to 20 microns. In other words, the system for viewing has a spectral band width extending at least from 6 through 20 microns.

The system for viewing according to the invention has a wide range of sensitivity as to the power density of incident infrared waves and as to the range of wave lengths.

Contrarily to systems in which the change of the photochromic pigments is a photo-induced change, here the change of the pigments is thermally induced by a modification of the temperature of the system on which the pigments will be deposited. Said system does not require photo change properties nor absorption properties of the thermochromic pigments in the infrared region. The thermochromic pigments are essentially sensitive to a temperature increase of the matrix in which they are dispersed.

According to an aspect of the invention, said stack has a absorption coefficient α range of infrared wavelengths, preferably comprised between 1 and 20 microns, a density r and a heat capacity Cp defining a relationship $$\frac{a}{r \cdot C_p}$$

higher than a threshold value on said region of infrared wavelengths, said relationship being adapted for inducing, by means of local absorption of an incident infrared wave having a wavelength in said region of infrared wavelengths and a power density I, a local temperature increase dT in said stack such as $$dT \approx \frac{a \cdot I}{r \cdot C_p}$$

when the incident infrared wave has a power density I within a range of, preferably, 1 mW·cm$^{-2}$ to 100 W·cm$^{-2}$.

Preferably, the material of the substrate is selected from paper, cardboard, plastic material, metal, or a ceramic, preferably alumina ($Al_2O_3$).

According to an aspect of the invention, said at least one intermediate layer comprises a layer with index contrast in the visible region formed from a material having a weak absorption coefficient in the visible spectral region, said layer with index contrast being preferably a layer charged with titanium dioxide ($TiO_2$).

According to another aspect of the invention, said at least one intermediate layer comprises an infrared absorbing layer, said infrared absorbing layer having an absorption coefficient higher than 20% in at least a part of the wavelength region comprised between 1 and 20 microns, said infrared absorbing layer being preferably charged with carbon black.

In a particularly advantageous manner, the system for viewing comprises a first zone adapted for absorbing a first infrared wave having a power density comprised in a first range of power densities, preferably comprised between 5 W/cm$^2$ and about 100 W/cm$^2$, the system for viewing being adapted for transforming, by thermal conduction, a temperature increase induced by absorption of the first infrared wave into a local temperature increase dT1 higher than a thermochromic change threshold in a first region of the layer of thermchromic pigments such as to induce a thermochromic change of the layer of thermochromic pigments that produces a change of the apparent color of the solid thermal layer of thermochromic pigments when the first infrared wave has a power density comprised in the first range of power densities. The system for viewing comprises a second zone adapted for absorbing a second infrared wave having a power density comprised in a second range of power densities, preferably comprised between 1 mW/cm$^2$ and 5 W/cm$^2$, and the system for viewing is adapted for transforming, by thermal conduction, a temperature increase induced by absorption of the second infrared wave in the stack into a local temperature increase dT2 higher than a thermochromic change threshold in a second region of said at least one solid thermal layer of thermchromic pigments such as to induce a thermochromic change of the said at least one layer of thermochromic pigments that produces another change of the apparent color of said at least one solid thermal layer of thermochromic pigments when the second infrared wave has a power density comprised in the second range of power densities.

According to a preferred embodiment, the solid thermal layer comprises at least one thermochromic pigment with or without spin transition, liquid crystals being excluded.

According to another preferred embodiment, the solid thermal layer comprises at least one thermochromic pigment selected from leuco dyes.

According to a variant, the solid thermal layer comprises a mixture of at least two thermochromic pigments having different transition temperature thresholds.

According to an aspect of an embodiment, the solid thermal layer of thermochromic pigments comprises nanoparticles and/or micro-particles of thermochromic pigments in a polymer matrix preferably absorbing in the infrared range comprised between 1 and 20 microns.

According to a particular and advantageous aspect of the invention, the substrate has a first face and a second face opposite to the first one, the second face of the substrate comprising at least one exposure zone having a bare surface adapted for receiving said incident infrared electromagnetic wave for operating in transmitting, and the first face being adapted for receiving said incident infrared electromagnetic wave for operating in reflection.

The invention is also related to a method of viewing an infrared electromagnetic wave emitted from a source, comprising the exposure of at least one zone of a system for viewing according to any of the embodiments, to an infrared wave having a power density higher than or equal to a power density threshold such as to induce, by absorption in the stack and then by thermal conduction, a local temperature increase in the layer of thermochromic pigments higher than a transition threshold $T_H$, adapted for inducing an apparent color change of one region of the solid thermal layer of thermochromic pigments.

The invention is applied in a particularly advantageous manner on cards for detecting and/or viewing the spatial distribution of the power density of infrared electromagnetic waves.

The present invention is also related to the characteristic features which will be disclosed hereafter in the description which follows and the features shall be considered individually or according to any technically possible combination thereof.

Figure 3:
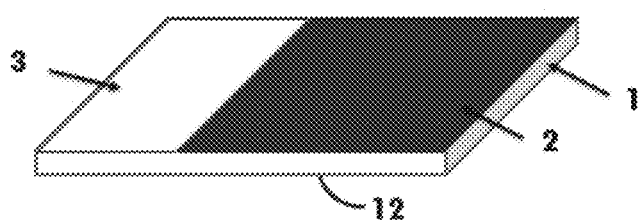
Figure 4:
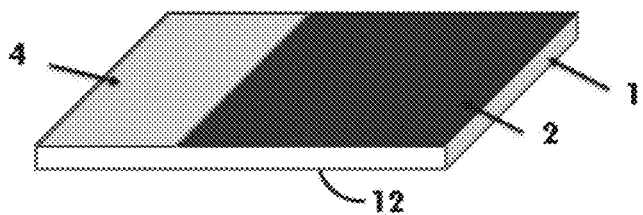
Figure 5:
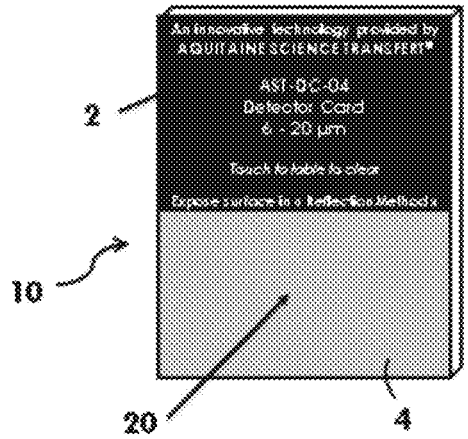
Figure 6:
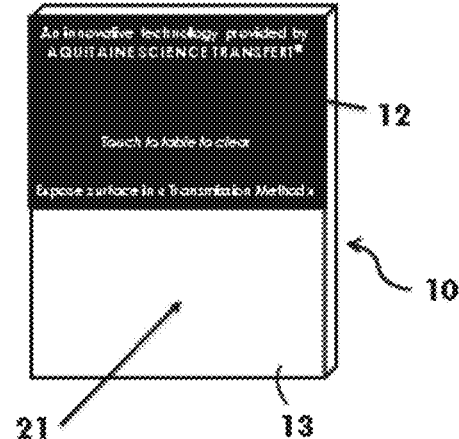
Figure 15A:
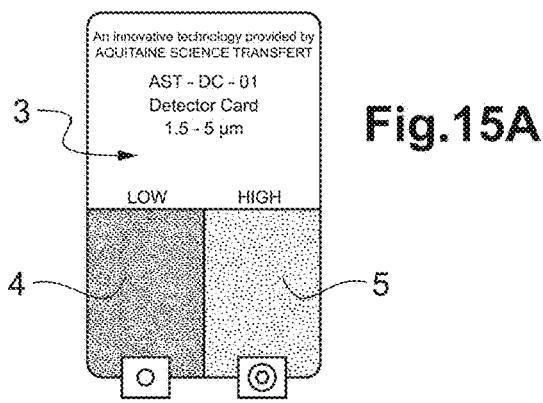
Figure 15B:
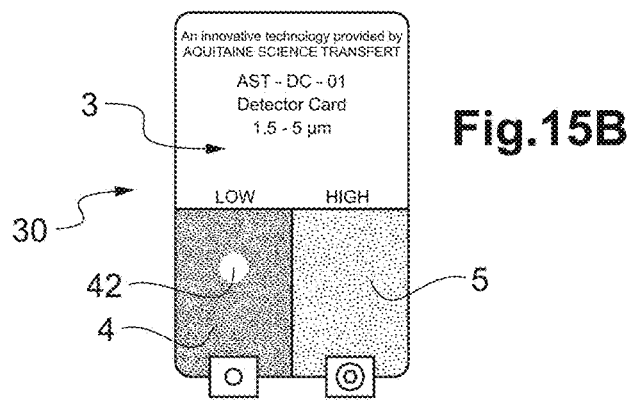

The description is made by way of example and not by way of limitation, and it will explain better, with reference to the figures, how the invention can be implemented. In the figures:

FIGS. 1-4 show different steps of manufacturing a system for viewing infrared waves according to a first embodiment, FIG. 5 shows an example of a system for viewing infrared waves, seen from the side of the surface provided with the thermochromic pigment layer, FIG. 6 shows the example of a system for viewing infrared waves of FIG. 5, seen from the side opposite to the one provided with the thermochromic pigment layer, FIGS. 7-10 show different steps of manufacturing a system for viewing infrared waves according to a second embodiment, FIGS. 11 and 12 show another example of a system for viewing with two regions of different sensitivity as to wavelengths and/or as to power density according to the second embodiment of the invention, FIG. 13 shows different colors associated to different temperature ranges for a mixture of thermochromic pigments, FIG. 14 shows an example of viewing the spatial distribution of the power density of an infrared electromagnetic wave with a mixture of thermochromic pigments, FIGS. 15A-15B show an example of an embodiment of an infrared card for viewing, FIGS. 16A-16D show another example of an embodiment of an infrared card for viewing operating in reflection and in transmission.

DETAILED DESCRIPTION

The invention is based on the interaction between an infrared electromagnetic wave and a system for viewing comprising a solid thermal layer, the thermal layer comprising a thermochromic material or thermochromic pigment.

Thermochromic pigments are able to change the apparent color in the visible light domain as a function of a temperature change, heating or cooling. The color change can be related to a change of the shape of a molecule, for example in the case of a leuco dye (dye of the leuco type), to a phase change. At 68° C., vanadium dioxide $VO_2$ has a phase transition from the semi-conductive state which has a monoclinic distorted structure to a metallic state which has a quadrant structure of the rutile type. In the same way, the semiconductor $BiVO_4$, a charge transfer material that is yellow at ambient temperature, has a red aspect at 300° C. Finally, that color change can be related to a spin transition, in the case of a spin transition material such as described, for example, in documents FR-2,894,581 and FR-2,963,015. A thermochromic pigment passes from a first color at a low temperature to a second color when the temperature increases above a transition threshold of temperature $T_H$. For certain materials, that transition is irreversible, for other materials it can be reversible. In the case where that transition is reversible, when the temperature passes under a certain threshold of temperature $T_B$, one observes an inverse color change. According to the physicochemical nature of the thermochromic material, the temperature range of transition for changing from one state to the other can spread over several degrees up to several tens of degrees. Further, quite a number of thermochromic materials have a thermal hysteresis loop.

The thermochromic materials also can show a photo-switching effect under an infrared wave of a precise wavelength.

Particularly, thermochromic compounds are known from document FR-2,963,015 which are of the spin transition type and which are either powders or integrated in a polymer matrix and which allow to view a laser beam at a wavelength of 10.6 microns having a power density comprised between 1 mW/cm² and 1 W/cm².

However, the thermochromic materials do not show a photo-switching effect over a large spectral infrared bandwidth going for example from 1 through 20 microns. On the other hand, spin transition materials have a low sensitivity.

In the field of thermochromic compounds, the leuco dyes offer an abrupt color change in a range of about 1.5° C. around the transition temperature $T_H$ which, at present, cannot be reached with traditional spin transition materials.

Leuco dyes thus are very reactive as to temperature changes and, therefore, allow to reach a high sensitivity.

In a more general manner, the direct photo-switching of a particular material, for example with spin transition, during exposure of that spin transition material to an infrared beam has a sensitivity spectrally limited to infrared and does neither allow to view an infrared beam over a large spectral region nor to view the spatial profile of the power density of an infrared beam.

Thus, a thermochromic material as such is not adapted for allowing to view an infrared beam having a wavelength in the region comprised between 1 and 20 microns.

It has been stated, and this is part of the present invention, that a prior-art device based on a phosphorescent material or on a thermochromic material can be adapted for the detection of an infrared beam in a relatively narrow spectral region and in a reduced range of power density, but it is not adapted for the detection of waves having a wavelength in a large spectral region of infrared and does not allow for viewing the spatial profile of the power density of an infrared beam.

What is proposed is a method of and a device for detecting and/or viewing the spatial distribution of the power density of an infrared electromagnetic wave based on the use of a system comprising a substrate 1, a solid layer 4 comprising particles of thermochromic pigments dispersed in a controlled manner in a matrix, and at least one intermediate layer 2, 3 located between the substrate and the solid layer 4.

The solid layer 4 comprising a thermochromic pigment is called thermal, i.e. thermosensitive, which means that it is sensitive to an increase and/or a decrease of temperature with respect of at least one transition threshold $T_H$. However, a thermochromic layer is not necessarily a thermally conductive layer: the matrix in which the thermochromic pigments are integrated may be a thermally isolating layer.

The operating principle of the viewing system is based on a local heating of the system subsequent to an exposure to an infrared electromagnetic wave.

More precisely, the infrared electromagnetic wave is absorbed by the viewing system and is transformed into a local increase of temperature which induces a color change, preferably a reversible one, of the applied thermochromic pigment. Thus, the thermochromic pigment changes indirectly the color under the radiation of an infrared wave when the temperature of the system locally increases above a transition threshold $T_H$ of the thermochromic pigment. When the radiation is interrupted, the infrared absorption in the viewing system and the induced heating end: the system goes back to an equilibrium at the ambient temperature and the thermochromic pigment gets back to its initial color.

Thus, what is proposed is a system for viewing comprising a stack, the stack comprising a substrate, a solid thermal layer of thermochromic pigments having at least one predetermined transition temperature ($T_B$, $T_B$) and at least one intermediate layer, the stack of the system for viewing having a predetermined absorption coefficient for an infrared wave over a whole range of wavelengths comprised between 1 and 20 microns, so that the system for viewing absorbs the infrared wave. On the other hand, the stack has a density r and a thermal capacity Cp which produce a local increase of the temperature in the stack and allow for transferring that increase of temperature to the region of the thermochromic layer which induces the change of the apparent color of the thermal layer when the infrared wave has a power density comprised in a range, preferably between 1 mW·cm⁻² and 100 mW·cm⁻².

The substrate used in the system for viewing can be of different types.

Substrate 1 preferably has the form of a thin plate with a thickness of some tenths of a millimeter up to several millimeters.

For example, substrate 1 can be made of paper, cardboard, wood, plastic material, ceramic or metal plate.

In a variant, the system for viewing has a sensitivity threshold preferably in the range of power density comprised between several mW·cm$^2$ and about 10 W·cm$^{-2}$, and one selects a substrate which has a low thermal conductivity, preferably less than 1 W·m$^{-1}$·K$^{-1}$ at ambient temperature, such as paper, wood, a plastic material such as PVC, in order to limit the thermal losses of the system for viewing towards the ambient air. Consequently, such a system for viewing has a relatively long relaxation time, in the order of 5 seconds to 10 seconds. It will be noticed that the relaxation time for the system to get back to the original color depends on the power density of the infrared wave.

In another variant, the system for viewing has a sensitivity threshold preferably in the range of power density comprised between 10 W·cm$^{-2}$ and about 100 W·cm$^{-2}$, and one selects a substrate which has a high thermal conductivity, preferably higher than 50 W·m$^{-1}$·K$^{-1}$ at ambient temperature, such as a metal plate or a ceramic plate, for example alumina. Such a system for viewing is more resistant to a high power density of the infrared wave and has a short relaxation time, in the order of 3 seconds.

The principle of detection of the viewing system of the invention is based on a color change of at least part of the thermochromic pigments dispersed in a solid matrix deposited as a layer on a substrate, the system comprising at least one other intermediate layer between the thermal layer and the substrate.

In order to determine the threshold of detection of the electromagnetic waves, it is necessary to take into account different physical parameters of the complete system for viewing.

The relationship between the modification of the temperature and the physical parameters of the system for viewing is the following:

$$dT \approx \frac{a \cdot I}{r \cdot C_p}$$

where dT is the modification of the temperature per time unit, I the power density per surface unit of the incident electromagnetic wave, a the absorption coefficient of the system for viewing, r the density of the system and Cp the thermal capacity of the system. The absorption coefficient a of the system for viewing generally depends on the wavelength.

Thus, for reducing the threshold of sensitivity and boosting the increase of the induced temperature dT for a set energy density per surface unit, it is preferable to select a system having a high absorption coefficient a, a low density r, and/or a low thermal capacity Cp.

Once the physical parameters of the system are selected, one selects a thermochromic pigment having a transition temperature higher than the utilization temperature, for example of ±5° C. above the utilization temperature.

One observes that the thermochromic pigments are not used here for directly absorbing infrared waves but as an indicator of a modification of the temperature of the system for viewing. The thermochromic pigments are selected essentially according to their transition temperature and their apparent color in the visible domain. The thermochromic pigments are advantageously dispersed in a liquid matrix which is made solid after having been deposited on the substrate and the intermediate layer. The quantity of dispersed pigments depends on the initial color and on the desired color change. For example, the quantity of dispersed pigments is comprised between 5% and 20% in weight of the total weight in an ink forming the solid thermal layer charged with thermochromic pigments.

According to an advantageous aspect, the intermediate layer or layers deposited between the substrate and the thermal layer allow to provide, by reflection or transmission, a visual contrast allowing the user to better view a color change.

In a complementary manner, the intermediate layer or layers also can absorb part of the infrared electromagnetic wave.

FIGS. 1 through 4 show different steps of manufacturing a system for viewing an infrared wave according to a first embodiment of the invention which is compatible with a higher power density of an electromagnetic wave in the order of 10 W·cm$^{-2}$ to about 100 W·cm$^{-2}$.

FIG. 1 shows a substrate 1. In an advantageous manner, the substrate 1 is a substrate having a good mechanical resistance to higher temperatures and a good thermal conductivity (higher than 50 W·m$^{-1}$·K$^{-1}$ at ambient temperature). For example, substrate 1 is formed from a metal plate or a ceramic plate such as alumina. The thickness of the substrate is preferably comprised between several tens of a millimeter and several millimeters.

A layer 2 is deposited on a first face of the substrate which covers the whole surface of the first face. In an advantageous manner, the layer 2 is an infrared absorbing layer, for example composed of carbon black which absorbs over a very wide spectral region from the visible light up to infrared. One utilizes, for example, a varnish charged with carbon black (series UVISOFT) from the company VFP Ink Technologies.

Figure 2:
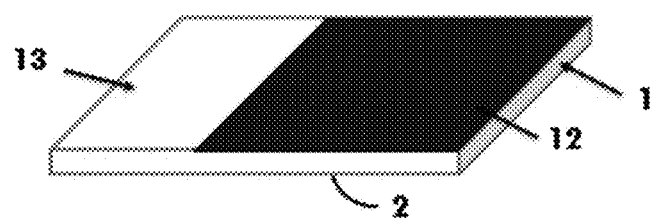

FIG. 2 shows the substrate 1 of FIG. 1, seen from the second face which is opposite to the first face. On FIG. 2, a layer 12 has been deposited which allows to delineate the zone for exposure to infrared waves in the transmission mode. The zone for exposure to infrared waves in the transmission mode does not comprise any deposit and is indicated by the bare surface 13 of the substrate 1 which is opposite to the thermal zone 4.

FIG. 3 shows the substrate 1 of FIG. 1 as seen from the first face. A layer 3 with an index contrast, preferably a white opaque varnish, has been deposited which covers part of the absorbing layer 2. In an embodiment, the layer 3 with index contrast is a varnish charged with titanium dioxide (TiO$_2$) from the company VFP Ink Technologies (series UVISOFT).

On FIG. 4, a thermal layer 4 has been deposited comprising particles of thermochromic pigments dispersed in a matrix. For example, the thermal layer 4 is formed by depositing a colorless varnish from the company VFP Ink Technologies (series UVISOFT), charged with thermochromic pigments. The color of the varnish may be, for example, orange or violet in the initial state below the transition threshold T$_H$.

In a particular embodiment, the matrix of the thermal layer 4 is a varnish that can be polymerized by an ultraviolet irradiation. One polymerizes the thermal layer 4 charged with thermochromic pigments in the same way by exposure to an ultraviolet wave. According to a variant, the thermal layer is formed by a colorless varnish based on solvents which is made solid by evaporation.

According to a specific method, the different layers 2, 12, 3, and 4 are deposited by silk-screen printing in one or several steps.

The thickness of the absorbing layer 2, of the layer 3 with index contrast, and of the thermal layer 4 is preferably comprised between several tenths of a micron and several hundreds of microns.

FIG. 5 shows a system for viewing obtained according to the method described in details with reference to FIGS. 1 through 4, as seen from the face provided with the thermal layer 4. One has printed on the layer 2, for example by silk-screen printing with white ink, indications as to operation of the device such as the region of the wavelength, here for example from 6 through 20 microns. In another example, the region of the wavelength of the system for viewing spreads from 1.5 through 5 microns.

The system for viewing 10 of FIG. 5 thus operates in a reflection mode. An infrared wave 20 having a power density of 10 to 50 W/cm$^2$ is incident on the thermal layer 4. When an infrared wave 20 is incident on the layer 4 charged with thermochromic pigments, the infrared wave can be absorbed by the matrix of the thermal layer and/or by the layer 3 with index contrast and/or by the absorbing layer 2 and/or by the substrate 1. The absorbed infrared wave transforms into a local increase of the temperature of the system for viewing 10. That increase of the temperature as induced by absorption of the infrared wave 20 in the stack, is transferred by heat conduction to the thermal layer 4. When the increase of the temperature of the thermal layer 4 is higher than the transition temperature $T_H$, it induces a transition of the thermochromic pigments and thus a local change of the apparent color of the thermal layer into the visible domain. An observer thus detects a color change on the surface of the thermal layer directly exposed to the infrared wave 20.

FIG. 6 shows the system for viewing of FIG. 5, as seen from the face opposite to the one provided with the layer 4 of thermochromic pigments.

The system for viewing 10 of FIG. 6 operates in a transmission mode. An infrared beam 21 having a high power density from 50 to 100 W/cm$^2$ is incident on the bare surface 13 of the substrate 1. The infrared wave can be absorbed by the substrate 1 and/or by the different layers situated on the opposite face, i.e. by the absorbing layer 2, and/or by the layer 3 with index contrast and/or by the matrix of the thermal layer 4. The thus absorbed infrared wave 21 induces a local increase of the temperature in the stack of the system for viewing 10. That increase of the temperature as induced in the stack is transferred by thermal conduction to the thermal layer 4. When the increase of the temperature of the thermal layer 4 is higher than the transition temperature $T_H$ of the thermochromic pigments, it induces a transition of the thermochromic pigments and thus a local change of the apparent color of the thermal layer into the visible domain. An observer thus detects a color change on the face which is opposite to the face exposed to the infrared wave 21.

In the transmission mode, the layer of thermochromic pigments is not directly exposed to the electromagnetic wave. The mechanical resistance of the substrate allows to the system to support high power densities, for example in the order of 100 W·cm$^2$. Using the system in the transmission mode allows to avoid damaging the thermal layer 4 due to a direct exposure to an infrared wave 21 of high power density.

The sensitivity to power density of a same system for viewing is different according to whether it is used in the reflection mode (FIG. 5) or in the transmission mode (FIG. 6). Thus, a unique system for viewing such as shown on FIGS. 5 and 6 has two complementary ranges of operating.

Such a system for viewing 10 allows to view and to simply localize an electromagnetic wave of low or of high power density.

Figure 16A:
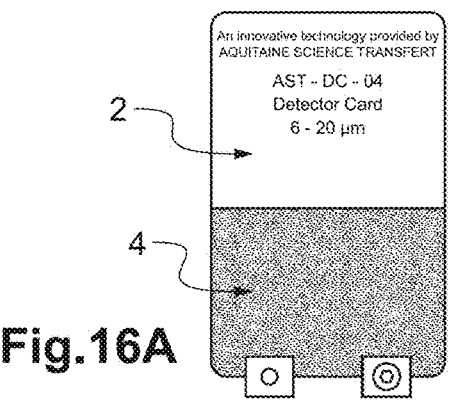
Figure 16B:
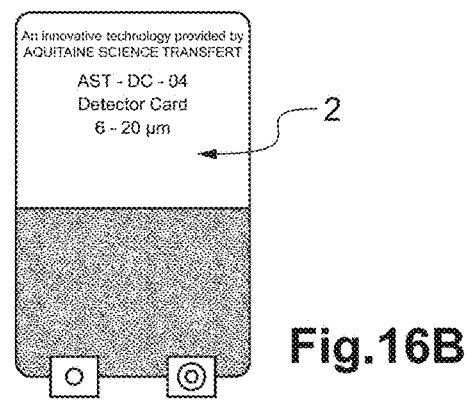
Figure 16C:
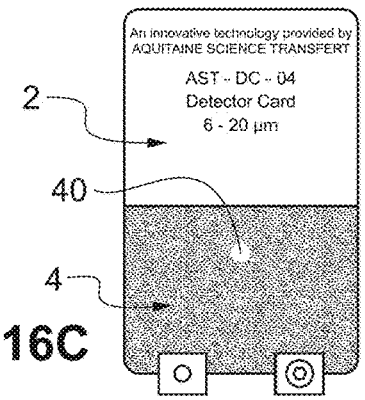
Figure 16D:
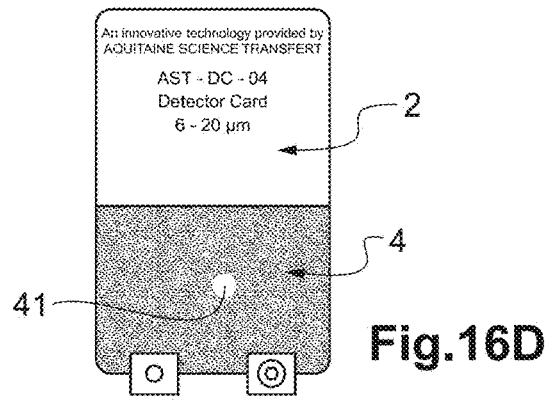

FIGS. 16A-16D show the operation of a system for viewing such as described with respect to FIGS. 5 and 6. On FIG. 16A, a card for viewing at ambient temperature is shown, as seen from the side of the thermal layer 4. The thermal layer 4 is deposited in a rectangular shape and appears to be gray at ambient temperature. On FIG. 16B, the card for viewing of FIG. 16A is shown at a temperature higher than the transition temperature of the thermal layer: the thermochromic pigments have switched over and the thermal layer appears homogeneously green. On FIG. 16C, the same card for viewing at ambient temperature is shown as exposed to an infrared wave at a wavelength of 10.6 microns, having a power density of 20 W/cm$^2$ in the reflection mode. One can see a lighter spot on FIG. 16C at the center of the thermal layer, which allows to view and to localize the infrared wave. On FIG. 16D, the same card for viewing at ambient temperature is shown, as exposed to an infrared wave having a wavelength of 10.6 microns, a power density of 60 W/cm$^2$, in the transmission mode. One observes on FIG. 16D, at the center of the thermal layer, a lighter central spot 41 which allows to view and to localize the infrared wave by transmission.

FIGS. 7 through 10 show different steps of manufacturing a system for viewing an infrared wave according to a second embodiment.

Figure 7:
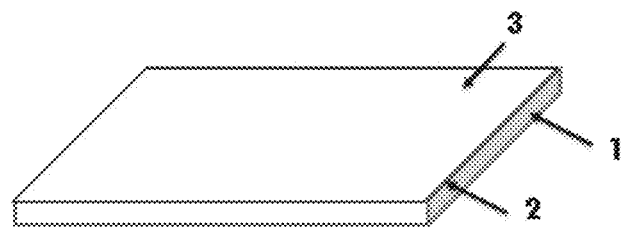

FIG. 7 shows a substrate 1, for example formed by a white card made of PVC, for example laminated without a protective layer (or overlay). On a first face of the substrate 1, an absorbing layer 2 has been deposited which covers the whole surface of the first face. In an advantageous manner, the layer 2 is composed of carbon black which absorbs over a very wide spectral region from the visible light up to infrared. One utilizes, for example, a varnish charged with carbon black from the company VFP Ink Technologies (series UVISOFT). On the layer 2, a contrast layer 3 has been deposited which covers the whole surface of the layer 2. In an advantageous manner, the contrast layer 3 is a white opaque varnish. In an embodiment, the contrast layer 3 is a varnish charged with titanium dioxide (TiO$_2$) from the company VFP Ink Technologies (series UVISOFT).

Figure 8:
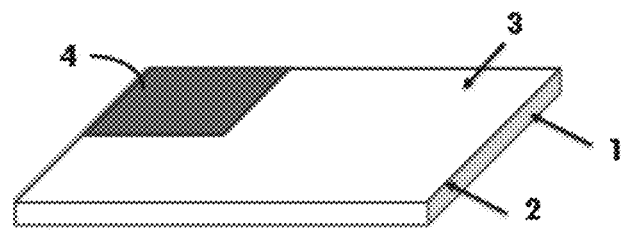

On FIG. 8, a first thermal layer 4 has been deposited comprising particles of thermochromic pigments dispersed in a matrix in one region only of the contrast layer 3. For example, the first thermal layer 4 is formed by depositing a colorless varnish from the company VFP Ink Technologies (series UVISOFT), charged with thermochromic pigments.

Figure 9:
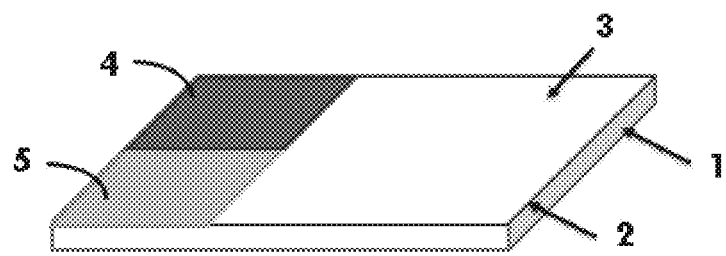

On FIG. 9, another thermal layer 5 has been deposited which comprises particles of thermochromic pigments dispersed in a matrix on another region of the surface of the contrast layer 3, which is different from the region of the first thermal layer 4. For example, the thermal layer 5 is formed by depositing a colorless ink (series UVISOFT) from the company VFP Ink Technologies, charged with thermochromic pigments of another color corresponding to another transition temperature ($T_H$) and thus to a different sensitivity from that of the first thermal layer 4.

In the state below their respective transition threshold, for example, the color of the varnish of the first thermal layer 4 can be for example pink, and the color of the other thermal layer 5 can be violet or black.

In a particular embodiment, the varnish of the thermal layers 4 and 5 is a varnish that can be polymerized by an ultraviolet irradiation. One polymerizes the thermal layer 4 charged with thermochromic pigments in the same way by exposure to an ultraviolet wave. Advantageously, the absorbing layer 2, the contrast layer 3, and the thermal layers 4 and 5 are deposited by silk-screen printing in one or several steps.

Figure 10:
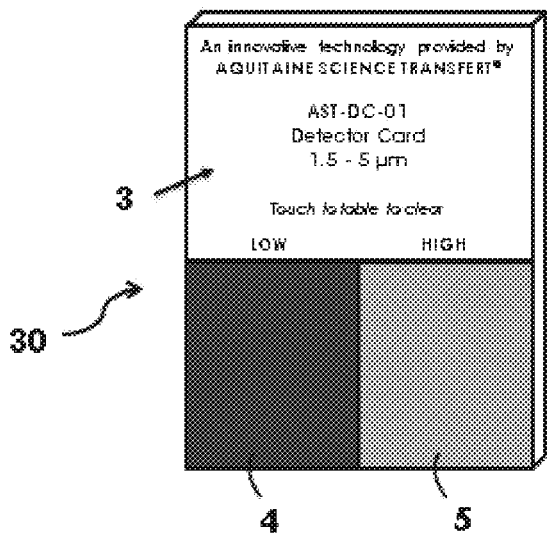

FIG. 10 shows a system for viewing obtained according to the method described in details with reference to FIGS. 7 through 9, as seen from the face provided with the thermal layers 4 and 5. One has printed on the contrast layer 3, for example by silk-screen printing with black ink, indications as to operation of the device such as the region of the wavelength, here for example from 1.5 through 5 microns.

FIG. 11 shows another embodiment of the method of manufacturing, which is analogous to the method depicted with reference to FIGS. 7-8 and in which other thermal layers 14, 15 are deposited adjacently on a contrast layer 3 which itself has been deposited on an layer 2 absorbing in the infrared domain, for example made of carbon black, covering the substrate 1.

On FIG. 12, another embodiment of the system for viewing is shown, as obtained according to the method described in details with reference to FIGS. 7, 8, and 11, as seen from the face provided with the thermal layers 14 and 15 charged with thermochromic pigments. One has printed, for example silk-screen printed, with black ink on the contrast layer 3, indications as to the operation of the device, such as le range of wavelength which spreads from 6 through 20 microns.

The systems for viewing depicted on FIGS. 10 and 12 operate by reflection, the infrared wave being incident on one of the thermal layers 4 or 5 for the system for viewing 30 of FIG. 10, and, respectively, on one of the layers of thermal pigments 14 or 15 for the device for viewing 30 of FIG. 12.

The use of a system for viewing 30 can have two different ranges of sensitivity according to the power density of the electromagnetic wave to be viewed.

On the other hand, one can use two systems for viewing 30, each one having sensitivity ranges with respect to specific wavelengths.

In a particularly advantageous manner, one chooses a thermochromic pigment which reacts at ambient temperature, whose transition temperature $T_H$ preferably is situated above the ambient temperature, what allows to register not permanently a trace of the infrared wave during the period of time necessary for the observation, and to cancel it by heating or cooling.

In a preferred manner, a thermochromic pigment is used that has a transition range as abrupt as possible, i.e. the transition of the whole thermochromic pigment spreads over a transition range which is narrow as to the temperature. Advantageously, one uses leuco dyes which have the advantage of having a hysteresis loop over a range of 1.5 to 2° C., only.

Advantageously, one chooses a thermochromic pigment having a transition temperature from low temperature color to high temperature color such that this transition temperature is situated in a range comprised between +5 degrees and +20 degrees above the ambient temperature. Thus, the thermochromic pigment is not very sensitive to ambient variations of some degrees of the ambient temperature and does not switch over spontaneously.

The greater the difference between the utilization temperature of the system and the transition temperature, the higher the power density which is necessary for obtaining the switching over of the thermochromic pigment and the higher the sensitivity threshold of the card for viewing.

Among the thermochromic pigments, the compounds with spin transition can be cited, which are described in patent documents FR-2,894,581 and FR-2,917,410, and which are available as micrometer-sized or nanometer-sized particles. Those compounds have a variety of colors in each state of spin depending on the composition, the concentration, the dimensions, and the shape of the particles.

In an advantageous manner, one can use as thermochromic pigments those which are commercialized by the companies Naxagoras Technology, Paint With Pearl, Solar Color Dust or still those which especially have the shape of thermochromic capsules from the French company Gem'Innov. The thermochromic pigments have the advantage of being available over a wide range of apparent colors in the visible domain.

Further, the thermochromic pigments are available in a very large variety of colors and with a large range of transition temperatures, which allows to adapt the configuration of a system for viewing to different applications.

More precisely, the value of the threshold of the power density which allows to switch over the thermal layer, depends especially on the infrared absorption coefficient of the stack and the spectrum of the infrared wave.

In a third embodiment, one uses a thermal ink comprising a mixture of thermochromic pigments having different switching temperatures. One mixes, for example, a first thermochromic pigment having a switching temperature $T_H$ equal to 30° C. with a second thermochromic pigment having a switching temperature $T_H$ equal to 42° C., and then a third thermochromic pigment having a switching temperature $T_H$ equal to 60° C. thus, one obtains a thermal layer having four apparent colors indicating respectively four temperature ranges: a first color below 30° C., a second color between 30° C. and 42° C., a third color between 45° C. and 60° C., and, finally, a fourth color above 60° C. FIG. 13 shows an example of mixing three thermochromic pigments associated to different apparent colors depending on the temperature ranges. When the thermal layer of the mixture of pigments is at a temperature lower than 30° C., its apparent color 45 is blue. Then, when the same thermal layer is at a temperature comprised between 30° C. and 42° C., its apparent color 46 is light blue. For a temperature comprised between 45° C. and 60° C., the apparent color 47 of the thermal layer becomes green. Finally, for a temperature above 60° C., the apparent color 48 is white.

FIG. 14 depicts the exposure of a system for viewing according to the third embodiment to an infrared wave of a wavelength of 10.6 microns having a power density of 10 W/cm². The system for viewing comprises a stack formed by a substrate, an intermediate layer, and a thermal layer. Here, the thermal layer 4 comprises a mixture of different thermochromic pigments. One observes a spot at the center of the thermal layer 4 on which one can distinguish four colors: the white color 48 at the center where the power density of the wave is the highest one, the green color 47 as a ring surrounding the center, the light blue color 46 surrounding the green ring 47, and the blue color 45 over the entire rest of the surface of the thermal layer. Each color being associated to a temperature range. The apparent color of the thermal layer of the mixture of pigments thus allows to determine the range of temperatures. After calibration, that range of temperatures can be associated, for a determined range of infrared wavelengths, to different ranges of power density of infrared waves.

A thermal layer comprising such a mixture of different thermochromic pigments thus allows to view the spatial distribution of the power density of an electromagnetic wave.

However, the thermal conductivity of the system may induce a thermal diffusion in the system which is harmful to the spatial resolution of the color change.

In a variant, one deposits the mixture of thermochromic pigments as pads (or patches) on a support which does not absorb much and which has a good thermal conductivity. That variant allows to view the spatial distribution of the intensity of the incident wave.

In an advantageous manner, the selection of the pigments allows to select different temperature ranges and different colors.

The system for viewing according to one or the other of the embodiments of the invention gives a simple and efficient reply to the problem of viewing an invisible wave with a naked eye.

The implementation of such a system for viewing is extremely simple. That simplicity of use is particularly advantageous as compared to existing electronic systems for viewing an infrared wave.

Thus, a device for viewing an infrared wave has been manufactured which operates preferably between 1 and 20 microns and with a spectral wideness spreading over several microns. For example, the spectral band of the device for viewing spreads from 1.5 through 5 microns and/or from 6 through 20 microns.

The duration of exposure which is necessary to allow to view the infrared wave depends on numerous parameters, among which are the absorption coefficient of the stack and the type of thermochromic pigments of the thermal layer. Practically, the response time can be from several milliseconds to several tens of seconds.

FIGS. 15A-15B show a card for infrared viewing at ambient temperature, respectively without exposure to an infrared wave and then with exposure to an infrared beam having a wavelength of 2 microns and a power density of 500 mW/cm$^2$. On FIG. 15A, the thermal layer has a uniform color. On FIG. 15B, the spot 42 which is lighter at the center of the thermal layer 4, corresponds to the region of exposure to an infrared wave.

The system for viewing undergoes a local temperature change induced by absorption of the infrared wave, which produces a transition of the thermochromic pigments associated to a change of the apparent color of the thermal layer. Outside the region of thermal diffusion, the rest of the surface of the card for viewing has not undergone a sufficient temperature change for inducing a transition of the thermochromic pigments and change the color. The light spot slowly fades away when the infrared wave is blocked and the card recovers its uniform color.

The invention allows to view and to localize a wave in the region of the infrared wavelengths.

One example of a device for viewing has been tested for a power density in the order of 500 mW/cm$^2$ with a laser source emitting continuously at the following wavelengths: 2 microns, 3 microns, and 4 microns, with an exposure time of several seconds in the reflection mode. The unpolarized wave emitted from that source is directly used without any specific precautions. One same card for viewing allows to view the infrared wave at the different wavelengths indicated above.

One example of a device for viewing operating in the reflection mode and in the transmission mode has been tested with a CO$_2$ laser source providing an electromagnetic wave at a wavelength of 10.6 microns. For that application, a thermally conductive substrate is used, preferably a ceramic material such as alumina (Al$_2$O$_3$). In the reflection mode, the card for viewing allows to view a CO$_2$ laser beam having a power density of 20 mW/cm$^2$ with an exposure time of several seconds. In the transmission mode, the same card for viewing allows to view a CO$_2$ laser beam having a power density of 60 mw/cm$^2$ with an exposure time of several seconds without deterioration of the system for viewing. The apparent dimensions of the spot on the card for viewing depend on the power density and the time of exposure to the laser beam. The more the power density and/or the exposure time increases, the larger is the spot. The dimensions of the spot does not correspond exclusively to the spatial distribution of the beam.

The invention takes advantage of the absorption of an infrared wave by a stack of different materials and of the thermal conduction from that stack to a thermal layer for allowing to view an infrared wave in a spectral region and in a range of power density going from a low power density to a high power density.

The invention replies in a simple and efficient manner to a problem of viewing an infrared wave in a frequency range which is invisible to the naked eye.

The invention allows to localize an infrared wave of a laser source or another source. The invention further allows to characterize the spatial distribution of a laser beam of an infrared wave. Consequently, the invention facilitates adjusting an infrared optical assembly. The invention allows to considerably extend the spectral region of viewing over a large spectral region of the infrared light.

In an advantageous manner, the thermochromic pigments that can be used represent a large scale of colors for viewing in the visible light domain. The implementation of the device for and of the method of viewing according to the invention is inexpensive. Further, the invention is very little sensitive to variations of the ambient temperature or the ambient light.

Using different thermochromic pigments having different transition thresholds depending on the power density of the infrared wave, allows to obtain devices for viewing having a different sensitivity. Thus, it is possible to adjust the sensitivity of the device for and of the method of viewing according to the power of the infrared wave that is intended to be viewed.

The invention claimed is:

1. A system for viewing an infrared electromagnetic radiation emitted from a source, the infrared electromagnetic radiation having a wavelength higher than 1.5 microns and lower than 20 microns and a power density I comprised within a range of 1 mW·cm$^{-2}$ to 100 W·cm$^{-2}$, the system for viewing comprising:
    a substrate;
    at least one solid heat-sensitive layer comprising thermochromic pigments dispersed in a solid matrix, the thermochromic pigments having at least one transition temperature, said at least one transition temperature being associated with an apparent color change of said thermochromic pigments, the solid heat-sensitive layer comprising at least one thermochromic pigment selected from leuco dies; and
    at least one intermediate layer deposited on a face of the substrate, the at least one intermediate layer being situated between the substrate and the solid heat-sensitive layer comprising the thermochromic pigments, said at least one intermediate layer being thermally conductive, wherein said substrate, said at least one intermediate layer, and the solid heat-sensitive layer all together constitute a stack configured to absorb the infrared electromagnetic radiation and to induce a local temperature increase dT, wherein said at least one intermediate layer is configured to transfer by thermal conduction said local temperature increase dT to a region of the solid heat-sensitive layer to induce an apparent local change of color of the solid heat-sensitive layer of thermochromic pigments, and wherein said at least one intermediate layer comprises a layer with an index contrast in the visible range formed from a material having a weak absorption coefficient in the visible spectral range, said layer with the index contrast being a layer charged with titanium dioxide.

2. The system for viewing according to claim 1, wherein said stack has an absorption coefficient a in a range of infrared wavelengths, a density r, and a heat capacity $C_p$, defining a relationship $$\frac{a}{r \cdot C_p}$$

higher than a threshold value on said range of infrared wavelengths, said relationship being configured to induce, by local absorption of an incident infrared radiation having a wavelength in said range of infrared wavelengths and a power density I, a local temperature increase dT in said stack such as $$dT \approx \frac{a \cdot I}{r \cdot C_p}$$

when the power density I of the incident infrared radiation is within a range of 1 mW·cm$^{-2}$ to 100 W·cm$^{-2}$.

3. The system for viewing according to claim 1, wherein the material of substrate is selected from paper, cardboard, plastic material, metal, and a ceramic.

4. The system for viewing according to claim 1, wherein said at least one intermediate layer comprises an infrared absorbing layer, said infrared absorbing layer having an absorption coefficient higher than 20% in at least a part of the wavelength range comprised between 1.5 and 20 microns, said infrared absorbing layer being charged with carbon black.

5. The system for viewing according to claim 1, further comprising:

a first zone configured to absorb a first infrared radiation having a power density comprised in a first range of power densities, comprised between 5 W/cm$^2$ and about 100 W/cm$^2$, the system being configured to transform, by thermal conduction, a temperature increase induced by absorption of the first infrared radiation into a local temperature increase dT1 higher than a thermochromic switching threshold in a first region of the layer of thermochromic pigments to induce a thermochromic switching of the layer of thermochromic pigments that produces a change of the apparent color of the solid heat-sensitive layer of thermochromic pigments when the first infrared radiation has a power density comprised in the first range of power densities; and a second zone configured to absorb a second infrared radiation having a power density comprised in a second range of power densities, comprised between 1 mW/cm$^2$ and 5 W/cm$^2$, the system being configured to transform, by thermal conduction, a temperature increase induced by absorption of the second infrared radiation in the stack into a local temperature increase dT2 higher than a thermochromic switching threshold in a second region of said at least one solid heat-sensitive layer of thermochromic pigments to induce a thermochromic switching of the said at least one layer of thermochromic pigments that produces another change of the apparent color of said at least one solid heat-sensitive layer of thermochromic pigments when the second infrared radiation has a power density comprised in the second range of power densities.

6. The system for viewing according to claim 1, wherein the solid heat-sensitive layer comprises a mixture of at least two thermochromic pigments having different transition temperature thresholds.

7. The system for viewing according to claim 1, wherein the substrate has a first face and a second face opposite to the first face, the second face of the substrate comprising at least one exposure zone having a bare surface configured to receive said incident infrared electromagnetic radiation for operating in transmission, the first face being configured to receive said incident infrared electromagnetic radiation for operating in reflection.

8. A method of viewing an infrared electromagnetic radiation emitted from a source, the method comprising:

exposing at least one zone of the system for viewing according to claim 1 to an infrared radiation having a power density higher than or equal to a power density threshold to induce, by absorption in the stack and then by thermal conduction, a local temperature increase in the layer of thermochromic pigments higher than a transition threshold $T_H$, to induce an apparent color change of one region of the solid heat-sensitive layer of thermochromic pigments.

9. The system for viewing according to claim 3, wherein said at least one intermediate layer comprises an infrared absorbing layer, said infrared absorbing layer having an absorption coefficient higher than 20% in at least a part of the wavelength range comprised between 1.5 and 20 microns, said infrared absorbing layer being charged with carbon black.

10. The system for viewing according to claim 3, further comprising:

a first zone configured to absorb a first infrared radiation having a power density comprised in a first range of power densities, comprised between 5 W/cm$^2$ and about 100 W/cm$^2$, the system being configured to transform, by thermal conduction, a temperature increase induced by absorption of the first infrared radiation into a local temperature increase dT1 higher than a thermochromic switching threshold in a first region of the layer of thermochromic pigments to induce a thermochromic switching of the layer of thermochromic pigments that produces a change of the apparent color of the solid heat-sensitive layer of thermochromic pigments when the first infrared radiation has a power density comprised in the first range of power densities; and a second zone configured to absorb a second infrared radiation having a power density comprised in a second range of power densities, comprised between 1 mW/cm$^2$ and 5 W/cm$^2$, the system being configured to transform, by thermal conduction, a temperature increase induced by absorption of the second infrared radiation in the stack into a local temperature increase dT2 higher than a thermochromic switching threshold in a second region of said at least one solid heat-sensitive layer of thermochromic pigments to induce a thermochromic switching of the said at least one layer of thermochromic pigments that produces another change of the apparent color of said at least one solid heat-sensitive layer of thermochromic pigments when the second infrared radiation has a power density comprised in the second range of power densities.

11. The system for viewing according to claim 3, wherein the solid heat-sensitive layer comprises a mixture of at least two thermochromic pigments having different transition temperature thresholds.

12. The system for viewing according to claim 3, wherein the substrate has a first face and a second face opposite to the first face, the second face of the substrate comprising at least one exposure zone having a bare surface configured to receive said incident infrared electromagnetic radiation for operating in transmission, the first face being configured to receive said incident infrared electromagnetic radiation for operating in reflection.

* * * * *